United States Patent
Harutyunyan et al.

(10) Patent No.: US 8,088,488 B2
(45) Date of Patent: *Jan. 3, 2012

(54) METHOD FOR SYNTHESIS OF METAL NANOPARTICLES

(75) Inventors: Avetik Harutyunyan, Columbus, OH (US); Leonid Grigorian, Columbus, OH (US); Toshio Tokune, Dublin, OH (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 645 days.

This patent is subject to a terminal disclaimer.

(21) Appl. No.: 11/241,542

(22) Filed: Sep. 30, 2005

(65) Prior Publication Data
US 2007/0227306 A1    Oct. 4, 2007

Related U.S. Application Data

(62) Division of application No. 10/304,342, filed on Nov. 26, 2002, now Pat. No. 6,974,493.

(51) Int. Cl.
*B32B 5/30* (2006.01)

(52) U.S. Cl. .......... 428/404; 75/370; 502/327; 502/328; 502/329; 977/777

(58) Field of Classification Search .................. 75/255; 977/777, 896
See application file for complete search history.

(56) References Cited

U.S. PATENT DOCUMENTS

| | | | |
|---|---|---|---|
| 5,165,909 A | 11/1992 | Tennent et al. | |
| 5,618,475 A | 4/1997 | Johnson et al. | |
| 5,665,277 A | 9/1997 | Johnson et al. | |
| 5,759,230 A | 6/1998 | Chow et al. | |
| 5,783,263 A | 7/1998 | Majetich et al. | |
| 6,436,167 B1 | 8/2002 | Chow et al. | |
| 6,596,187 B2 * | 7/2003 | Coll et al. | 216/56 |
| 6,624,070 B2 | 9/2003 | Merricks et al. | |
| 6,676,729 B2 * | 1/2004 | Sun | 75/348 |
| 6,682,523 B2 * | 1/2004 | Shadduck | 606/6 |
| 6,716,409 B2 * | 4/2004 | Hafner et al. | 423/447.1 |
| 6,846,345 B1 * | 1/2005 | Keller et al. | 75/255 |
| 6,875,253 B2 | 4/2005 | Daimon et al. | |
| 7,041,394 B2 * | 5/2006 | Weller et al. | 428/836 |
| 2002/0184969 A1 | 12/2002 | Kodas et al. | |
| 2003/0133865 A1 | 7/2003 | Smalley et al. | |

FOREIGN PATENT DOCUMENTS

JP    S53-91054    8/1978

(Continued)

OTHER PUBLICATIONS

An, Lei et al., "Synthesis of Nearly Uniform Single-Walled Carbon Nanotubes Using Identical Metal-Containing Molecular Nanoclusters as Catalysts," JACS Communications, Oct. 26, 2002, pp. 13688-13689, Published on the Web.

(Continued)

*Primary Examiner* — George Wyszomierski
(74) *Attorney, Agent, or Firm* — Fenwick & West LLP; Mark Duell

(57) ABSTRACT

Metal nanoparticles are formed by heating or refluxing a mixture of a metal salt, such as a metal acetate, and a passivating solvent, such as a glycol ether, at a temperature above the melting point of the metal salt for an effective amount of time.

21 Claims, 7 Drawing Sheets

FOREIGN PATENT DOCUMENTS

| | | |
|---|---|---|
| JP | S56-136904 | 10/1981 |
| JP | S61-69906 | 4/1986 |
| JP | 11-246901 | 9/1999 |
| JP | H11-293308 | 10/1999 |
| JP | 2001-254109 | 9/2001 |
| JP | 2002-255519 | 9/2002 |
| WO | WO 01/49599 | 7/2001 |
| WO | WO 02/060623 A2 | 8/2002 |

OTHER PUBLICATIONS

Bladh K. et al., "On the Iron-Catalysed Growth of the Single-Walled Carbon Nanotubes and Encapsulated Metal Particles in the Gas Phase," Applied Physics A, Materials Science & Processing, Mar. 1, 2000, pp. 317-322, Springer-Verlag, Published Online.

Burns, P. et al., "Emulsion/Aggregation Technology: A Process for Preparing Microspheres of Narrow Polydispersity," Proceedings of the Fourth International Conference on Scientific and Clinical Applications of Magnetic Carriers, May 9-11, 2002, pp. 162-164, Tallahassee, FL.

Cheung, C.L. et al., "Diameter-Controlled Synthesis of Carbon Nanotubes," Journal of Physical Chemistry B, 2002, pp. 2429-2433, vol. 106, No. 10.

Dai, Hongjie et al., "Single-Wall Nanotubes Produced by Metal-Catalyzed Disproportionation of Carbon Monoxide," Chemical Physics Letters, Sep. 27, 1996, pp. 471-475, Elsevier Publishing Company.

Dubrovinsky, L. et al., "Pressure-Induced Invar Effect in Fe-Ni Alloy," Physical Review Letters, May 21, 2000, pp. 4851-4854, vol. 86, No. 21.

Fu, L. et al., "Synthesis and Patterning of Magnetic Nanostructures," Proceedings of the Fourth International Conference on Scientific and Clinical Applications of Magnetic Carriers, May 9-11, 2002, pp. 170-171, Tallahassee, FL.

Gotic, M. et al., "Formation of Nanocrystalline NiFe2O4," Philosophical Magazine Letters, Sep. 1998, pp. 193-201, vol. 76, No. 3.

Hafner, Jason H. et al., "Catalytic Growth of Single-Wall Carbon Nanotubes from Metal Particles," Chemical Physics Letters, Sep. 27, 1996, pp. 195-202, Elsevier Publishing Company.

Harutyunyan, A.R. et al., "CVD Synthesis of Single Wall Carbon Nanotubes Under 'Soft' Conditions," Nano Letters, 2002, pp. 525-530, vol. 2, No. 5.

Hernadi, K. et al., "Carbon Nanotubes Production over Co/Silica Catalysts," Catalysis Letters, pp. 229-238, J.C. Baltzer AG.

Hornyak, G.L. et al., "A Temperature Window for Chemical Vapor Decomposition Growth of Single-Wall Carbon Nanotubes," Journal of Physical Chemistry B, Feb. 2002, pp. 2821-2825, vol. 106.

Kodama, R.H., "Magnetic Nanoparticles," Journal of Magnetism and Magnetic Materials, 1999, pp. 359-372, vol. 200.

Nieuwenhuys, G.J., "Magnetic Behavior of Cobalt, Iron and Manganese Dissolved in Palladium," Advances in Physics, Jul. 4, 1975, pp. 515-591, vol. 24, No. 4.

Oswald, A. et al., "Giant Moments in Palladium," Physical Review Letters, Mar. 31, 1986, pp. 1419-1422, vol. 56, No. 13.

Pannaparayil, T. et al., "A Novel Low-Temperature Preparation of Several Ferrimagnetic Spinels and Their Magnetic and Mossbauer Characterization," Journal of Applied Physics, Nov. 15, 1988, pp. 5641-5643, vol. 64, No. 10.

Prasad, S. et al., "Magnetic Studies of Nanosized Nickel Ferrite Particles Synthesized by the Citrate Precursor Technique," Journal of Alloys and Compounds, 1998, pp. 87-92, vol. 265.

Puntes, V.F. et al., "Tuning the SP (superparamagnetic) to FM (ferromagnetic) Transition of Cobalt Nanoparticles in View of Biomedical Applications," Proceedings of the Fourth International Conference on Scientific and Clinical Applications of Magnetic Carriers, May 9-11, 2002, pp. 143-146, Tallahassee, FL.

Suslov, A., "Synthesis of Magnetic Cluster Nanoparticles," Proceedings of the Fourth International Conference on Scientific and Clinical Applications of Magnetic Carriers, May 9-11, 2002, pp. 214-216, Tallahassee, FL.

Wang, Y.F. et al., "Graphical Method for Assigning Raman Peaks of Radial Breathing Modes of Single-Wall Carbon Nanotubes," Chemical Physics Letters, 2001, pp. 47-52, vol. 336.

Wilson, K.S., "A Generalized Method for Magnetite Nanoparticle Steric Stabilization Utilizing Block Copolymers Containing Carboxylic Acids," Proceedings of the Fourth International Conference on Scientific and Clinical Applications of Magnetic Carriers, May 9-11, 2002, pp. 220-223, Tallahassee, FL.

Zaluska, A. et al., "Nanocrystalline Magnesium for Hydrogen Storage," Journal of Alloys and Compounds, 1999, pp. 217-225, vol. 288.

Ziolo, R.F., "Matrix-Mediated Synthesis of Nanocrystalline gamma-Fe2O3: A New Optically Transparent Magnetic Material," Science, Jul. 10, 1992, pp. 219-223, vol. 257.

Harutyunyan, A.R., et al., "CVD Synthesis of Single Wall Carbon Nanotubes Under 'Soft' Conditions," Nano Letters, 2002, pp. 525-530, vol. 2, No. 5.

Dhas, N. A., et al., "Synthesis, Characterization, and Properties of Metallic Copper Nanoparticles," Chemistry of Materials, American Chemical Society, May 1998, pp. 1446-1452, vol. 10, No. 5.

European Patent Office Communication, European Patent Application No. EP 03775902.4, Feb. 11, 2009, six pages.

European Patent Office Supplementary European Search Report, European Patent Application No. EP 03775902.4, Nov. 24, 2008, two pages.

Japanese Office Action, Japanese Patent Application No. 2004-555047, Nov. 24, 2009, five pages.

Japanese Office Action, Japanese Patent Application No. 2004-555047, Nov. 9, 2010, three pages.

Japanese Office Action, Japanese Patent Application No. 2004-555048, Feb. 9, 2010, seven pages.

Japanese Office Action, Japanese Patent Application No. 2004-555049, Nov. 24, 2009, five pages.

Japanese Office Action, Japanese Patent Application No. 2004-555049, Nov. 9, 2010, three pages.

Li, Y. et al., "Growth of Single-Walled Carbon Nanotubes from Discrete Catalytic Nanoparticles of Various Sizes," Journal of Physical Chemistry B, 2001, pp. 11424-11431, vol. 105, No. 46.

* cited by examiner

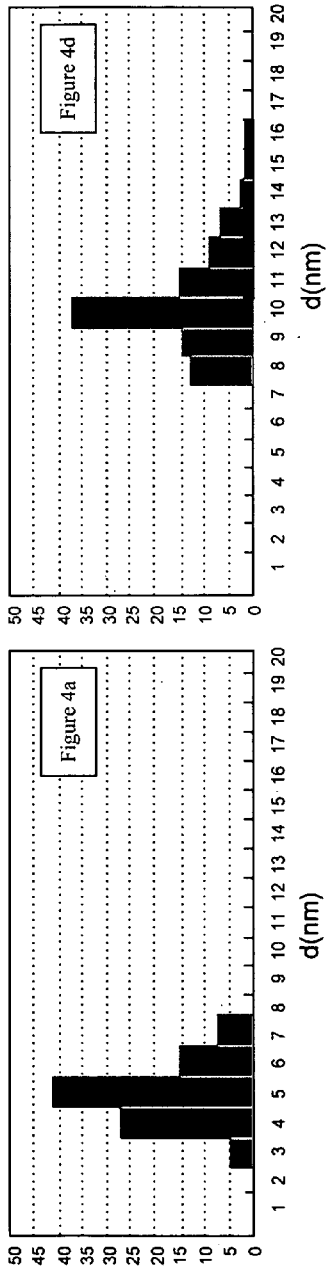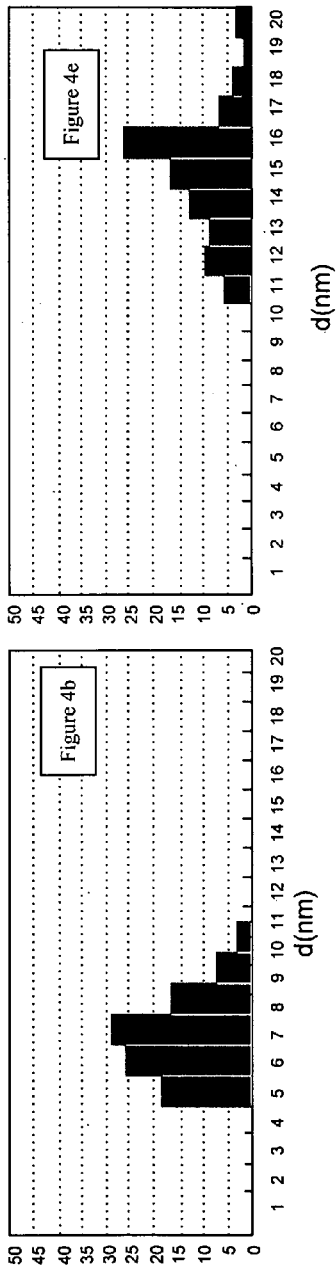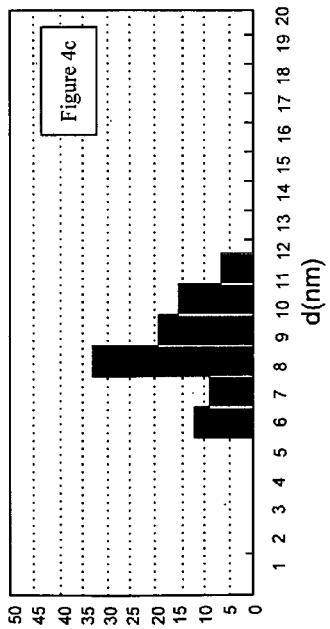
Figure 4a Fe acetate/glycol=1:1.5, 20min refluxing
Figure 4b Fe acetate/glycol=1:1.5, 45min refluxing
Figure 4c Fe acetate/glycol=1:1.5, 135min refluxing
Figure 4d Fe acetate/glycol=1:1.5, 300min refluxing
Figure 4e Fe acetate/glycol=1:1.5, 1200min refluxing

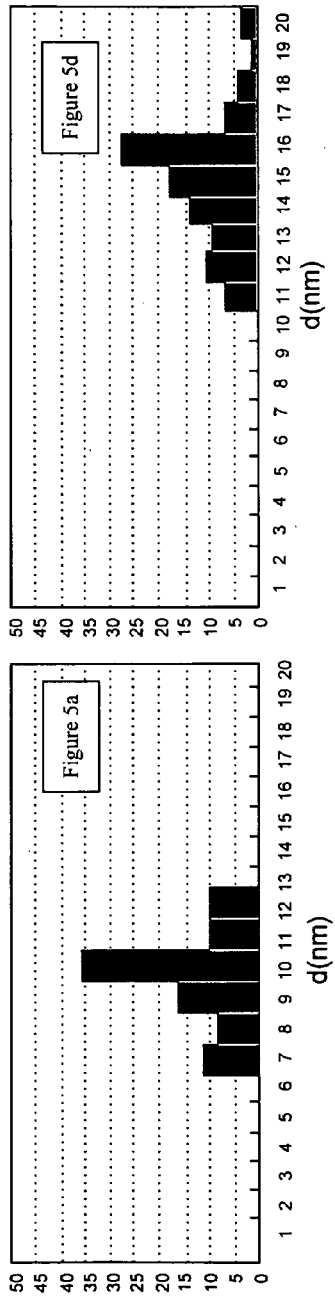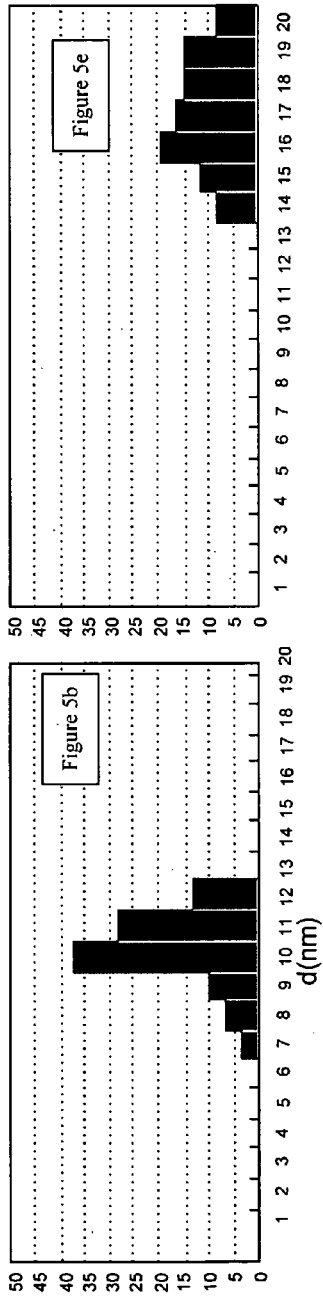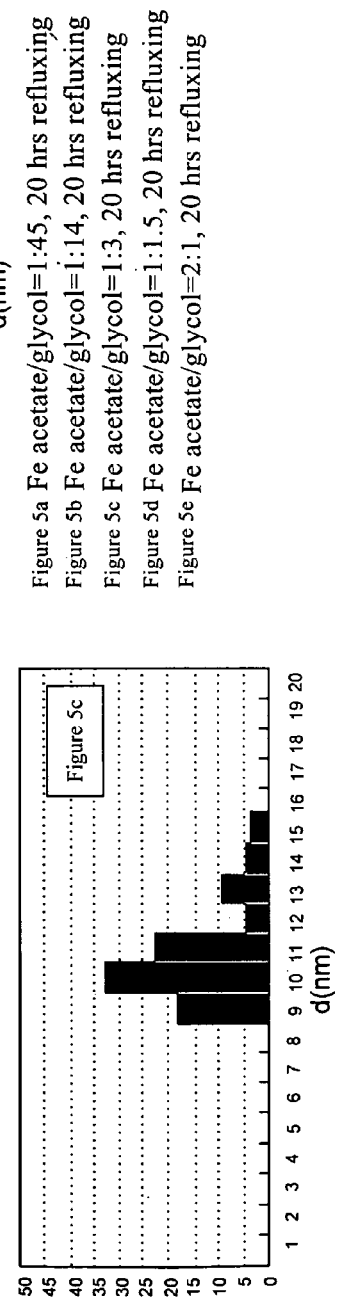
Figure 5a Fe acetate/glycol=1:45, 20 hrs refluxing
Figure 5b Fe acetate/glycol=1:14, 20 hrs refluxing
Figure 5c Fe acetate/glycol=1:3, 20 hrs refluxing
Figure 5d Fe acetate/glycol=1:1.5, 20 hrs refluxing
Figure 5e Fe acetate/glycol=2:1, 20 hrs refluxing

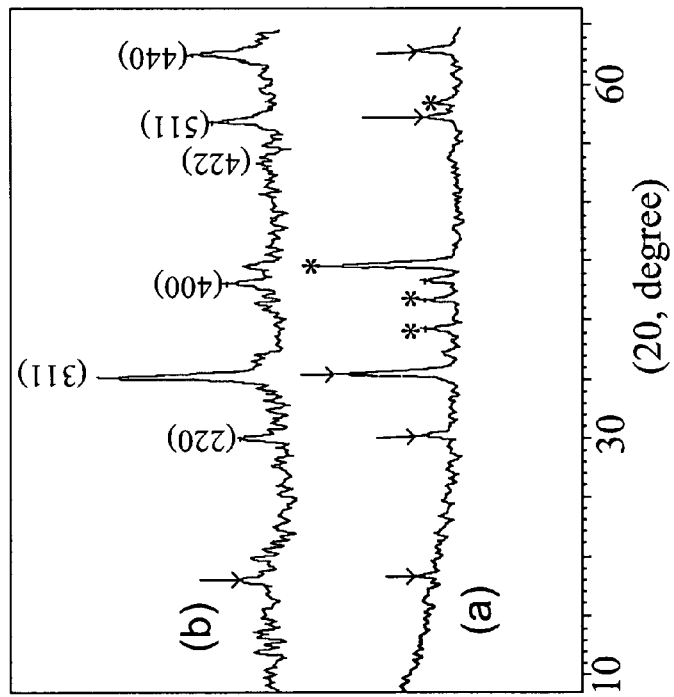

METHOD FOR SYNTHESIS OF METAL NANOPARTICLES

RELATED APPLICATIONS

This application is a divisional of U.S. patent application Ser. No. 10/304,342, now U.S. Pat. No. 6,974,493, filed on Nov. 26, 2002, and is related to U.S. patent application Ser. No. 10/304,317, now U.S. Pat. No. 7,214,361, and U.S. patent application Ser. No. 10/304,316, now U.S. Pat. No. 6,974,492, both filed on Nov. 26, 2002, all of which are incorporated by reference herein in their entirety.

FIELD OF INVENTION

The present invention relates to a method for the synthesis of metal nanoparticles.

BACKGROUND

Metal nanoparticles are an increasingly important industrial material. Due in part to their high surface area and high reactivity, metal nanoparticles may be used in a variety of applications, such as reaction catalysis (including serving as a reaction substrate), improving the behavior and properties of materials, and drug delivery. Particular applications for nanoparticles include serving as a catalyst for the synthesis of carbon nanotubes, serving as a catalyst for hydrogen gas synthesis, and production of metal hydrides.

Many techniques are currently used for the production of metal nanoparticles. Current techniques include plasma or laser-driven gas phase reactions, evaporation-condensation mechanisms, and various wet chemical techniques. This plurality of techniques is due in part to the fact that no current technique provides a reliable, simple, and low-cost method for production of nanoparticles of a controlled size. Some current techniques may produce particles of a desirable size, but with poor crystallinity or an unpredictable distribution of phases within the nanoparticles. Other techniques suffer from an inability to control the distribution of sizes around a desired nanoparticle size. Still other nanoparticle synthesis techniques require specialized equipment, long processing times, or expensive specialty chemicals.

One potentially attractive wet chemical technique for synthesis of metal nanoparticles is thermal decomposition, as these reactions may be carried using relatively simple equipment. However, currently known methods of metal nanoparticle formation using thermal decomposition require addition of a separate surfactant, thus increasing the complexity and cost of the method.

What is needed is a simple, reliable, and low cost thermal decomposition method for producing crystalline metal nanoparticles without use of a separate surfactant that allows for control of the average particle size while minimizing the amount of variance in the particle sizes.

SUMMARY

The present invention provides a method for the synthesis of metal nanoparticles via a thermal decomposition reaction. A metal acetate or other suitable metal salt is placed in a reaction vessel with a passivating solvent, such as a glycol ether. The contents of the reaction vessel are mixed for a period of time to form a substantially homogenous mixture. The contents of the reaction vessel are then refluxed at a temperature above the melting point of the metal acetate. The desired particle size is achieved by controlling the concentration of metal salt in the passivating solvent and by varying the amount of reflux time.

BRIEF DESCRIPTION OF THE DRAWINGS

FIGS. 4a-4e show histograms of metal nanoparticle sizes for metal nanoparticles produced via an embodiment of the present invention.

FIGS. 5a-5e show histograms of metal nanoparticle sizes for metal nanoparticles produced via another embodiment of the present invention.

FIG. 6 shows X-ray diffraction spectra of bimetallic nanoparticles produced according to various embodiments of the present invention.

DETAILED DESCRIPTION OF THE EMBODIMENTS

Figure 1:
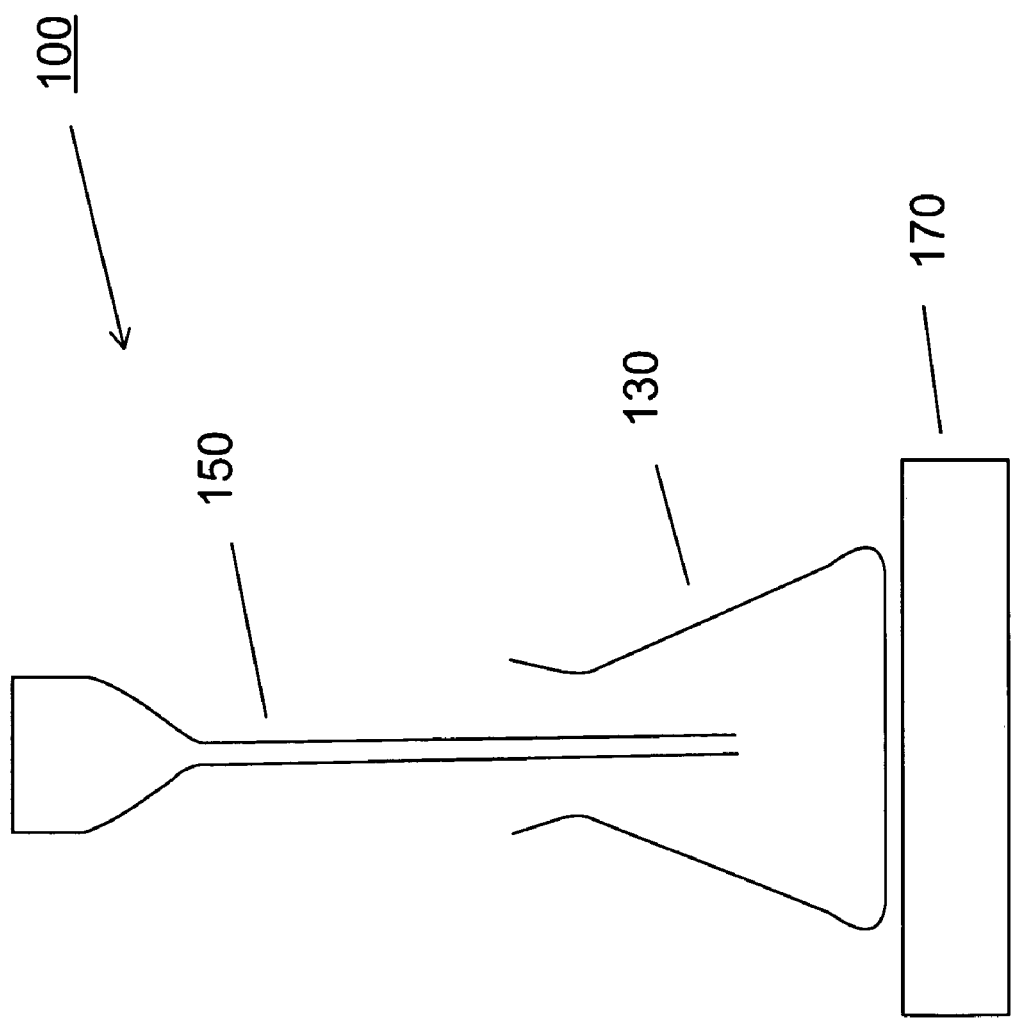
FIG. 1 shows one example of an apparatus for use in carrying out the present invention.
Figure 2:
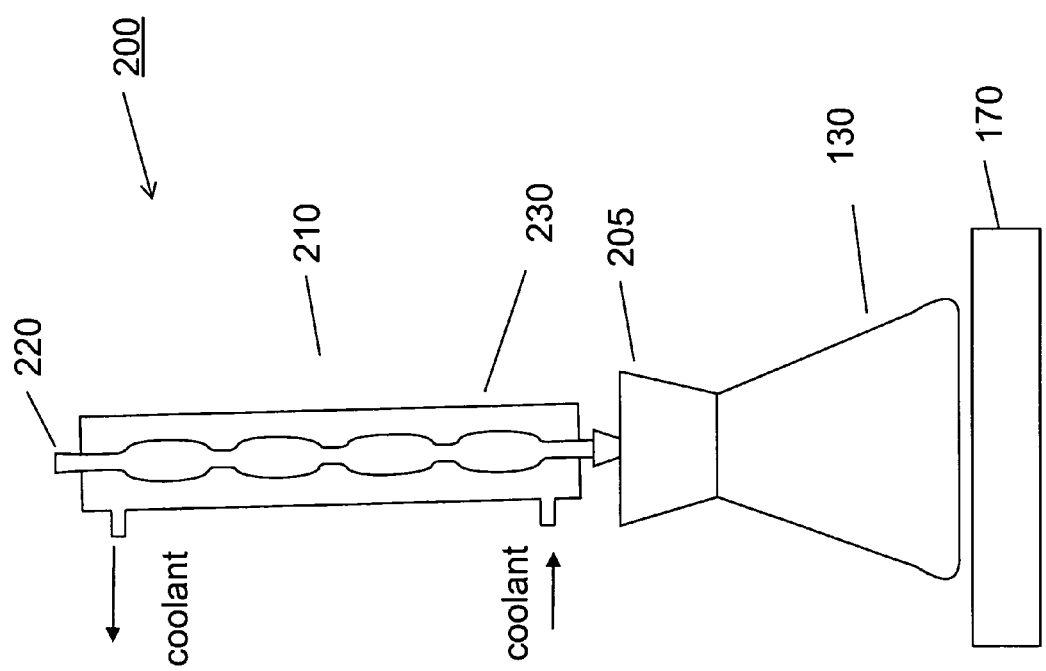
FIG. 2 shows another example of an apparatus for use in carrying out the present invention.

FIGS. 1 and 2 depict possible apparatuses that may be used for carrying out the present invention. While FIGS. 1 and 2 depict possible equipment selections, those skilled in the art will recognize that any suitable mixing apparatus and reflux apparatus may be used. Although no specialized equipment is required to carry out the present invention, the components used should be suitable for use with the various embodiments of this invention. Thus, the equipment should be safe for use with organic solvents and should be safe for use at the reflux temperature of the thermal decomposition reaction.

In FIG. 1, a mixing apparatus is generally shown at 100. Reaction vessel 130 may be any suitable vessel for holding the metal salt and passivating solvent mixture during the mixing and reflux steps of the present invention. In an embodiment, reaction vessel 130 may be a 500 ml glass or Pyrex™ Erlenmeyer flask. Other styles of reaction vessel, such as round-bottom flasks, may also be used as long as the reaction vessel is compatible for use with the mixing and reflux apparatuses. In the embodiment shown in FIG. 1, reaction vessel 130 is attached to sonicator 150. Sonicator 150 may be used to mix the contents of reaction vessel 130. A suitable sonicator is the FS60 available from Fisher Scientific of Pittsburgh, Pa. In other embodiments, the contents of reaction vessel 130 may be mixed by other methods, such as by using a standard laboratory stirrer or mixer. Other methods of mixing the solution will be apparent to those skilled in the art. Reaction vessel 130 may also be heated during mixing by a heat source 170. In FIG. 1, heat source 170 is shown as a hot plate, but other suitable means of heating may be used, such as a heating mantle or a Bunsen burner.

FIG. 2 depicts a reflux apparatus 200. In this apparatus, reaction vessel 130 is connected to a condenser 210. Condenser 210 is composed of a tube 220 that is surrounded by a condenser jacket 230. During a reflux operation, water or another coolant is circulated through condenser jacket 230 while heat is applied to reaction vessel 130. The coolant may be circulated by connecting the inlet of the condenser jacket to a water faucet, by circulating a coolant through a closed loop via a pump, or by any other suitable means. During reflux, evaporated passivating solvent rising from reaction vessel 130 will be cooled as it passes through tube 220. This will cause the passivating solvent to condense and fall back into reaction vessel 130. Note that the method of connecting condenser 210 with reaction vessel 130 should form a seal with the top of reaction vessel so that gases rising from the reaction vessel must pass through tube 220. This can be accomplished, for example, by connecting condenser 210 to the reaction vessel 130 via a stopper 205. The end of tube 220 is passed through a hole in stopper 205. As in FIG. 1, heat source 170 may be a hot plate, heating mantle, Bunsen burner, or any other suitable heating apparatus as will be apparent to those skilled in the art.

In other embodiments of the invention, both mixing and reflux may be accomplished using a single apparatus. For example, stopper 205 may have a second opening to allow passage of the shaft of the stirring rod from a laboratory mixer or stirrer. In these embodiments, once the metal salt and passivating solvent have been added to reaction vessel 130, the reaction vessel may be connected to the dual mixing and refluxing apparatus. Still other embodiments of how to mix and reflux the contents of a reaction vessel will be apparent to those skilled in the art.

Figure 3A:
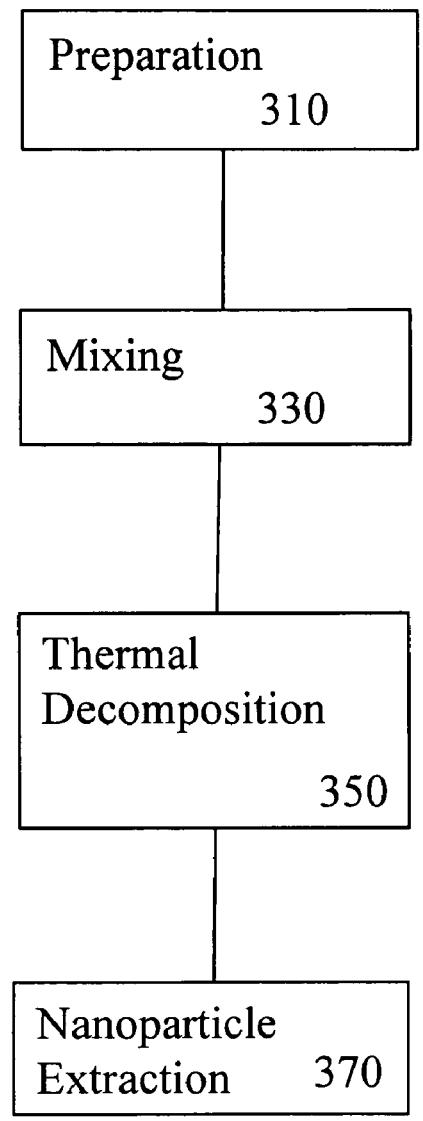
FIG. 3a depicts a flow chart for a method of producing metal nanoparticles according to an embodiment of the present invention.

FIG. 3a provides a flow diagram of the steps for an embodiment of the present invention. FIG. 3a begins with preparing 310 a mixture by adding a passivating solvent and a metal salt to a reaction vessel. Note that depending on the choice of metal salt and passivating solvent, this mixture could be in the form of a solution, suspension, or dispersion. In an embodiment, the passivating solvent is an ether. In another embodiment, the passivating solvent is a glycol ether. In still another embodiment, the passivating solvent is 2-(2-butoxyethoxy)ethanol, $H(OCH_2CH_2)_2O(CH_2)_3CH_3$, which will be referred to below using the common name dietheylene glycol mono-n-butyl ether. In yet another embodiment, the passivating solvent is a combination of two or more suitable solvents, such as a combination of two different glycol ethers. Additional substances that may serve as the passivating solvent will be discussed below.

In an embodiment, the metal salt will be a metal acetate. Suitable metal acetates include transition metal acetates, such as iron acetate, $Fe(OOCCH_3)_2$, nickel acetate, $Ni(OOCCH_3)_2$, or palladium acetate, $Pd(OOCCH_3)_2$. Other metal acetates that may be used include molybdenum. In still other embodiments, the metal salt may be a metal salt selected so that the melting point of the metal salt is lower than the boiling point of the passivating solvent.

As will be discussed below, the relative amounts of metal salt and passivating solvent are factors in controlling the size of nanoparticles produced. A wide range of molar ratios, here referring to total moles of metal salt per mole of passivating solvent, may be used for forming the metal nanoparticles. Typical molar ratios of metal salt to passivating solvent include ratios as low as about 0.0222 (1:45), or as high as about 2.0 (2:1). In an embodiment involving iron acetate and diethylene glycol mono-n-butyl ether, typical reactant amounts for iron acetate range from about $5.75 \times 10^{-5}$ to about $1.73 \times 10^{-3}$ moles (10-300 mg). Typical amounts of diethylene glycol mono-n-butyl ether range from about $3 \times 10^{-4}$ to about $3 \times 10^{-3}$ moles (50-500 ml).

In another embodiment, more than one metal salt may be added to the reaction vessel in order to form metal nanoparticles composed of two or more metals. In such an embodiment, the relative amounts of each metal salt used will be a factor in controlling the composition of the resulting metal nanoparticles. In an embodiment involving iron acetate and nickel acetate as the metal salts, the molar ratio of iron acetate to nickel acetate is 1:2. In other embodiments, the molar ratio of a first metal salt relative to a second metal salt may be between about 1:1 and about 10:1. Those skilled in the art will recognize that other combinations of metal salts and other molar ratios of a first metal salt relative to a second metal salt may be used in order to synthesize metal nanoparticles with various compositions.

Figure 3B:
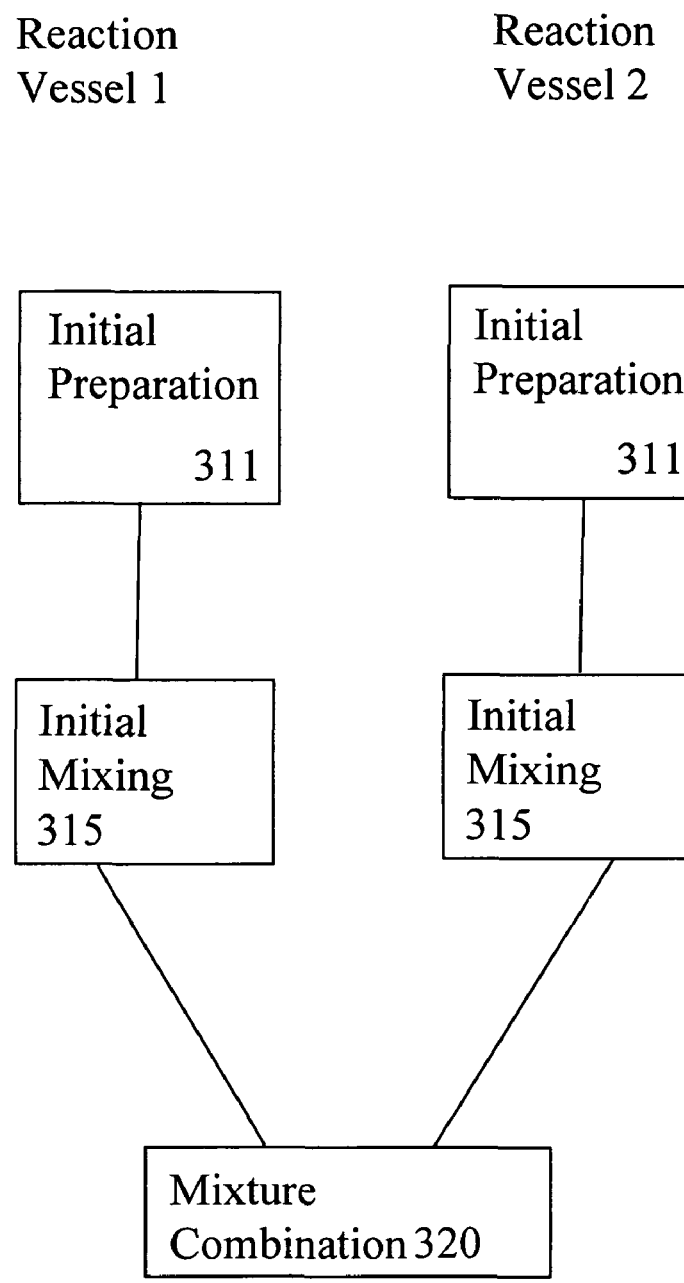
FIG. 3b depicts a flow chart for a method of producing metal nanoparticles according to another embodiment of the present invention.

In still another embodiment, preparing a mixture 310 may involve a series of steps, such as those shown in the flow diagram in FIG. 3b. FIG. 3b begins with initially preparing 311 two or more mixtures of metal salt and passivating solvent in separate reaction vessels. In an embodiment, each mixture is formed by adding one metal salt to a passivating solvent. In preferred embodiments, the same passivating solvent is used to form each of the metal salt and passivating solvent mixtures. After preparing the passivating solvent and metal salt mixtures in the separate reaction vessels, the contents of each of the reaction vessels are mixed during initial mixing 315. During initial mixing 315, the contents of the reaction vessels are mixed to create substantially homogeneous mixtures. The homogenous mixtures may be in the forms of mixtures, solutions, suspensions, or dispersions. In an embodiment, the contents of the reaction vessels are sonicated for 2 hours. In another embodiment, the contents of the reaction vessel may be mixed using a standard laboratory stirrer or mixer. Other methods for creating the homogeneous mixture or dispersion will be apparent to those skilled in the art. The contents of the reaction vessel may be heated during initial mixing 315 in order to reduce the required mixing time or to improve homogenization of the mixture. In an embodiment, the contents of the reaction vessels are sonicated at a temperature of 80° C. After first mixing 315, the homogenous mixtures are combined 320 into a single reaction vessel to create a mixture containing all of the metal salts and passivating solvents.

Returning now to FIG. 3a, after preparing 310 a mixture containing all metal salts and passivating solvents in a single reaction vessel, the contents of the reaction vessel are mixed during mixing 330. During mixing 330, the contents of the reaction vessel are mixed to create a substantially homogeneous mixture of metal salt in the passivating solvent. The homogenous mixture may be in the form of a mixture, solution, suspension, or dispersion. In an embodiment, the contents of the reaction vessel are mixed by sonication. In another embodiment, the contents of the reaction vessel may be mixed using a standard laboratory stirrer or mixer. The contents of the reaction vessel may also be heated during mixing 330 in order to reduce the required sonication or mixing time. In an embodiment, the contents of the reaction vessel are sonicated at 80° C. for two hours and then both sonicated and mixed with a conventional laboratory stirrer at 80° C. for 30 minutes. In another embodiment, the contents of the reaction vessel are sonicated at room temperature for between 0.5 and 2.5 hours. Other methods for creating the homogeneous mixture will be apparent to those skilled in the art.

After forming a homogenous mixture, metal nanoparticles are formed during the thermal decomposition 350. The thermal decomposition reaction is started by heating the contents of the reaction vessel to a temperature above the melting point of at least one metal salt in the reaction vessel. Any suitable heat source may be used including standard laboratory heaters, such as a heating mantle, a hot plate, or a Bunsen burner. Other methods of increasing the temperature of the contents of the reaction vessel to above the melting point of the metal salt will be apparent to those skilled in the art. The length of the thermal decomposition 350 will be dictated by the desired size of the metal nanoparticles, as will be discussed below. Typical reaction times may range from about 20 minutes to about 2400 minutes, depending on the desired nanoparticle size. The thermal decomposition reaction is stopped at the desired time by reducing the temperature of the contents of the reaction vessel to a temperature below the melting point of the metal salt. In an embodiment, the reaction is stopped by simply removing or turning off the heat source and allowing the reaction vessel to cool. In another embodiment, the reaction may be quenched by placing the reaction vessel in a bath. Note that in this latter embodiment, the temperature of the quench bath may be above room temperature in order to prevent damage to the reaction vessel.

In a preferred embodiment of the invention, the contents of the reaction vessel are refluxed during the heating step. In this embodiment, a standard reflux apparatus may be used, such as the one depicted in FIG. 2. During the thermal decomposition 350, water (or another coolant) is passed through condensing jacket 230. Vapors rising from the passivating solvent are cooled as they pass through tube 220, leading to condensation of the passivating solvent vapors. The condensed passivating solvent then falls back into the reaction vessel. This recondensation prevents any significant loss of volume of the passivating solvent during the thermal decomposition reaction. Thus, the relative ratio of metal to passivating solvent stays substantially constant throughout the reaction. Those skilled in the art will recognize that while refluxing is a preferred method for carrying out the thermal decomposition reaction, it is not necessary for nanoparticle formation. As long as the temperature of the homogeneous mixture is raised to above the melting point of the metal salt, the desired thermal decomposition reaction will take place and lead to formation of metal nanoparticles.

After forming the metal nanoparticles in the thermal decomposition 350, the metal nanoparticles are removed from the passivating solvent for use during nanoparticle extraction 370. The nanoparticles may be removed from the passivating solvent by a variety of methods. Those skilled in the art will recognize that the best method for extracting the nanoparticles may depend on the desired application. In an embodiment, a portion of the metal nanoparticle/passivating solvent mixture is mixed with ethanol. A suitable volume ratio for this mixture is 1 part passivating solvent to 5 parts ethanol. This mixture is then heated to a temperature below the melting point of the metal salt to evaporate the solvent and leave behind the metal nanoparticles. In another embodiment, the passivating solvent is directly evaporated away by heating the metal nanoparticle/passivating solvent mixture to a temperature where the passivating solvent has a significant vapor pressure. In still another embodiment, the nanoparticles remain in a thin film of the passivating solvent that is left behind after evaporation.

In another embodiment, particles of aluminum oxide ($Al_2O_3$) or silica ($SiO_2$) may be introduced into the reaction vessel after the thermal decomposition reaction. A suitable $Al_2O_3$ powder with 1-2 μm particle size and having a surface area of 300-500 $m^2/g$ is available from Alfa Aesar of Ward Hill, Mass. During nanoparticle extraction 370, $Al_2O_3$ powder is added to the metal nanoparticle/passivating solvent solution. In an embodiment, enough powdered oxide is added to achieve a desired weight ratio between the powdered oxide and the initial amount of metal used to form the metal nanoparticles. In an embodiment, this weight ratio is between roughly 10:1 and roughly 15:1. After adding the $Al_2O_3$ powder, the mixture of nanoparticles, powdered $Al_2O_3$, and passivating solvent is sonicated and mixed again to create a homogenous dispersion. The mixture is then heated to evaporate off the passivating solvent. In an embodiment involving dietheylene glycol mono-n-butyl ether as the passivating solvent, the mixture is heated to 231° C., the boiling point of the passivating solvent. Evaporating the passivating solvent leaves behind the metal nanoparticles deposited in the pores of the powdered $Al_2O_3$. This mixture of $Al_2O_3$ and metal nanoparticles is then ground up to create a fine powder. This method of removing the metal nanoparticles from solution may be used when the metal nanoparticles will be subsequently used for growth of carbon nanotubes.

Note that some nanoparticle extraction techniques 370 will modify the characteristics of the metal nanoparticles themselves. Metal nanoparticles are highly reactive, in part due to their high surface area to volume ratio. When certain types of metal nanoparticles are exposed to an environment containing oxygen, especially at temperatures above room temperature, the metal nanoparticles will have a tendency to oxidize. For example, iron nanoparticles extracted from a passivating solvent by heating the passivating solvent to 230° C. in the presence of oxygen will be at least partially converted to iron oxide nanoparticles. Thus, even though the present invention relates to the synthesis of metal nanoparticles, it is understood that the metal nanoparticles may subsequently become partially oxidized after the completion of the thermal decomposition reaction.

The size and distribution of metal nanoparticles produced by the present invention may be verified by any suitable method. One method of verification is transmission electron microscopy (TEM). A suitable model is the Phillips CM300 FEG TEM that is commercially available from FEI Company of Hillsboro, QR. In order to take TEM micrographs of the metal nanoparticles, 1 or more drops of the metal nanoparticle/passivating solvent solution are placed on a carbon membrane grid or other grid suitable for obtaining TEM micrographs. The TEM apparatus is then used to obtain micrographs of the nanoparticles that can be used to determine the distribution of nanoparticle sizes created.

FIGS. 4a-4e and 5a-5e depict histograms of particle size distributions for iron nanoparticles created under several conditions. The particle size distributions represent iron nanoparticles made by mixing iron acetate and diethylene glycol mono-n-butyl ether in a reaction vessel to form a homogeneous mixture. The contents of the reaction vessel were then refluxed at the boiling point of diethylene glycol mono-n-butyl ether (231° C.) for the time period specified in each figure. The figures also note the concentration of the metal acetate in the passivating solvent. The concentrations are specified as ratios of milligrams of iron acetate per milliliter of passivating solvent, but note that these ratios are coincidentally similar to the molar ratios, due to the similar molecular weights of iron acetate and diethylene glycol mono-n-butyl ether (173.84 g/mol versus 162.23 g/mol) and the fact that the density of diethylene glycol mono-n-butyl ether is close to 1.

Two factors used to control the size distribution of the nanoparticles were the concentration of metal in the passivating solvent and the length of time the reaction was allowed to proceed at the thermal decomposition temperature. FIGS. 4a-4e depict histograms from a series of reactions where the ratio of milligrams of iron acetate to milliliters of diethylene glycol mono-n-butyl ether was held constant at 1:1.5 while varying the length of the reflux at the reaction temperature. For comparison purposes, the histograms have been normalized so that the area under the histogram bars in each figure equals 100. FIG. 4a depicts results from the shortest reaction time of 20 minutes at the boiling point of diethylene glycol mono-n-butyl ether (231° C.). As shown in FIG. 4a, 20 minutes of thermal decomposition reaction time leads to a narrow distribution of particle sizes centered on 5 nm. FIGS. 4b-4e depict similar histograms for increasing amounts of reaction time. As seen in the figures, increasing the reaction time leads to an increase in the average particle size. Additionally, FIGS. 4d and 4e indicate that at the longest reflux times (300 minutes and 1200 minutes), the width of the particle size distribution also increases.

FIGS. 5a-5e provide additional results from thermal decomposition reactions with varying concentrations at a constant reaction time of 1200 minutes, or 20 hours. Note that even the lowest ratio of iron acetate to passivating solvent results in an average particle size of 10 nm. These results indicate that both low concentrations and short reaction times are required to achieve the smallest particle sizes.

When more than one type of metal salt is used in the synthesis of the metal nanoparticles, the composition of the resulting metal nanoparticles may be determined by using X-ray diffraction (XRD). A suitable XRD tool is a Bruker D-8 X-ray diffractometer available from Bruker-AXS GMBH of Karlsruhe, Germany. A sample of metal nanoparticles can be prepared for XRD analysis by placing a drop of metal nanoparticle/passivating solvent mixture on a measurement substrate, such as an $SiO_2$ substrate. The passivating solvent is then evaporated away by heating the substrate to 250° C., leaving behind the metal nanoparticles.

FIG. 6 shows a comparison of XRD spectra for metal nanoparticles formed by thermal decomposition of a mixture of iron acetate and nickel acetate in diethylene glycol mono-n-butyl ether. The relative molar ratio of iron to nickel within the mixture was about 2:1, while the relative molar ratio of metal acetate to passivating solvent was 1:1.5. The differ in g spectra are the result of differences in the preparation 310 and mixing 330 of the initial metal salt/passivating solvent mixtures. For spectrum a), the metal salt/passivating solvent mixture was prepared by adding iron acetate, nickel acetate, and diethylene glycol mono-n-butyl ether to a single reaction vessel. The contents of the reaction vessel were then sonicated for two hours at room temperature. Metal nanoparticles were then formed by refluxing the metal salt/passivating solvent mixture at 231° C. for 3 hours. For spectrum b), the metal nanoparticles were synthesized by first preparing separate mixtures of iron acetate in diethylene glycol mono-n-butyl ether and nickel acetate in diethylene glycol mono-n-butyl ether. These separate mixtures were sonicated at 80° C. for two hours. After this, the iron acetate/diethylene glycol mono-n-butyl ether mixture and the nickel acetate/diethylene glycol mono-n-butyl ether were combined in a single reaction vessel. This combined mixture was both mixed and sonicated at 80° C. for 30 minutes. Metal nanoparticles were then formed by refluxing the combined mixture at 231° C. for 3 hours.

A comparison of spectra a) and b) in FIG. 6 shows that the differing preparation 310 and mixing 330 procedures influenced the composition of the resulting metal nanoparticles. Note that due to the preparation technique used for obtaining the XRD spectra, the metal nanoparticles containing iron were at least partially oxidized. In FIG. 6, spectrum a) shows a series of peaks that are believed to represent crystallographic faces of $NiFe_2O_4$ particles. These peaks are identified with arrows. These same peaks are also visible in spectrum b), where some of the peaks are identified by the crystallographic face assigned to the peak. However, spectrum a) also shows several additional peaks identified with asterisks which have no counterpart in spectrum b). These peaks are believed to represent crystallographic faces of Ni particles.

Without being bound by any particular theory, it is believed that the differences between spectra a) and b) are the result of improved homogenization of the metal salt/passivating solvent mixture. The metal nanoparticles synthesized for spectrum b) were initially prepared in separate vessels and sonicated (and mixed) at a higher temperature than the metal nanoparticles synthesized for spectrum a). Additionally, the total sonication and mixing time for the metal nanoparticles synthesized for spectrum b) was greater than that for spectrum a). It is believed that the additional mixing and sonication prevented the formation of the segregated Ni metal nanoparticles observed in spectrum a). Note, however, that the metal salt/passivating solvent mixture used to prepare the metal nanoparticles in spectrum a) was still sufficiently homogenized to allow metal nanoparticle formation during the thermal decomposition reaction.

The embodiments discussed thus far have shown production of metal nanoparticles based on thermal decomposition of metal acetates in diethelyne glycol mono-n-butyl ether. However, the method may be more generally used with other combinations of metal salts and passivating solvents. Without being bound by any particular theory, it is believed that the present invention involves a thermal decomposition reaction of one or more metal salts in a passivating solvent. Because no additional surfactant is added to the reaction, the passivating solvent is believed to serve as a passivating agent that controls the growth of the metal nanoparticles. When a metal acetate is used as an initial metal salt, the acetate groups may also assist with passivation. However, it is believed that metal salts other than metal acetates may be selected so long as the melting point of the metal salt is lower than the boiling point of the passivating solvent. Suitable metal salts may include metal carboxylate salts.

As for the passivating solvent, without being bound by any particular theory, it is believed that the passivating solvent acts to prevent agglomeration of larger metal clusters during the thermal decomposition reaction. It is believed that as the metal salt decomposes, the smallest sizes of nanoclusters begin to nucleate. These small nanoclusters are highly reactive and would quickly aggregate into larger clusters of various sizes in the presence of a non-passivating solvent. It is believed that the passivating solvent binds to the surface of the nanoclusters and retards the growth and aggregation of the nanoclusters. In order to achieve this passivating effect, it is believed that the passivating solvent must be of a sufficient size and the solvent molecules must be composed of a minimum ratio of oxygen to carbon atoms. Thus, other organic molecules may be suitable as a passivating solvent as long as they meet several conditions. First, the passivating solvent must be a liquid with a sufficiently low viscosity in the vicinity of the melting point of the metal salt used in the thermal decomposition reaction. In addition to having a boiling point above the melting point of the metal salt, the passivating solvent must have low enough viscosity at a temperature below the melting point so that it is feasible to create the homogenous dispersion described above. Second, the individual passivating solvent molecules must be of a sufficient size. For straight chain molecules, such as diethylene glycol mono-n-butyl ether, the individual molecules should have a molecular weight of at least 120 g/mol. This minimum may vary for branched molecules depending on the nature and type of the branching. For example, a t-butyl type carbon group would be unlikely to assist in passivation of the surface of a metal nanoparticle, so molecules involving this type of molecular group would likely require a higher minimum molecular weight. Third, the individual passivating solvent molecules must have a sufficient ratio of oxygen to carbon within the molecule. In order to achieve passivation, ether linkages and carboxylate groups are more likely to exhibit passivating behavior than alcohol groups, so solvents such as the glycol ether described above would be preferred over molecules having a similar molecular weight that only contain alcohol functional groups. In the glycol ether described above, the ratio of oxygen to carbon atoms is 3:8. Other organic molecules with oxygen to carbon ratios near 1:3 may also be suitable. Thus, passivating solvents with oxygen to carbon ratios from 1:2 to 1:4 should be suitable. Additionally, it was noted above that the acetate groups provided when a metal acetate is selected as the metal salt may participate in passivating behavior. If a metal salt is selected that is not a metal acetate, passivating solvents with higher oxygen to carbon ratios, as well as greater numbers of ether and carboxylate functional groups, would be preferred.

While the invention has been particularly shown and described with reference to a preferred embodiment and various alternate embodiments, it will be understood by persons skilled in the relevant art that various changes in form and details can be made therein without departing from the spirit and scope of the invention.

We claim:

1. Metal nanoparticles produced by the process comprising the steps of:
    providing a mixture consisting essentially of a metal salt and a passivating solvent;
    mixing the mixture of said metal salt and said passivating solvent;
    heating the mixture of said metal salt and said passivating solvent to a temperature above the melting point of said metal salt and maintaining the temperature above the melting point of said metal salt to form metal nanoparticles; and
    adding particles comprising $Al_2O_3$ or $SiO_2$ and having a surface area of 300 to 500 $m^2/g$, thereby providing supported metal nanoparticles comprising said particles.

2. The metal nanoparticles produced by the process of claim 1, wherein the metal salt is a transition metal acetate.

3. The metal nanoparticles produced by the process of claim 1, wherein the metal salt is a metal carboxylate.

4. The metal nanoparticles produced by the process of claim 1, wherein the metal salt is a substance selected from the group consisting of iron acetate, palladium acetate, nickel acetate, and molybdenum acetate.

5. The metal nanoparticles produced by the process of claim 1, wherein the passivating solvent is a glycol ether.

6. The metal nanoparticles produced by the process of claim 1, wherein the passivating solvent is 2-(2-butoxyethoxy)ethanol.

7. The metal nanoparticles produced by the process of claim 1, wherein heating the mixture of said metal salt and said passivating solvent comprises the step of refluxing the mixture of said metal salt and said passivating solvent.

8. The metal nanoparticles produced by the process of claim 7, wherein the mixture of said metal salt and said passivating solvent is refluxed at the boiling point of said passivating solvent.

9. The metal nanoparticles produced by the process of claim 1, wherein the molar ratio of the mixture of said metal salt and said passivating solvent is between about 2:1 and about 1:45.

10. The metal nanoparticles produced by the process of claim 1, wherein mixing the mixture of said metal salt and said passivating solvent comprises the step of mixing the mixture of said metal salt and said passivating solvent to form a homogenous mixture.

11. The metal nanoparticles produced by the process of claim 1, wherein the mixture of said metal salt and said passivating solvent is mixed using a sonicator.

12. The metal nanoparticles produced by the process of claim 1, wherein the temperature of the mixture of said metal salt and said passivating solvent is maintained at a temperature above the melting point of said metal salt for a time between about 20 minutes and about 2400 minutes.

13. Metal nanoparticles produced by the process of claim 1,
    wherein the $Al_2O_3$ or $SiO_2$ particles have a particle size of 1 to 2 microns.

14. Metal nanoparticles produced by the process comprising the steps of:
    providing a mixture of a metal acetate and a passivating solvent;
    mixing the mixture of said metal acetate and said passivating solvent;
    heating the mixture of said metal acetate and said passivating solvent to a temperature above the melting point of said metal acetate and maintaining the temperature above the melting point of said metal acetate to form metal nanoparticles;
    adding particles comprising $Al_2O_3$ or $SiO_2$ and having a surface area of 300 to 500 $m^2/g$, thereby providing supported metal nanoparticles comprising said particles; and
    extracting the supported metal nanoparticles from said passivating solvent.

15. Metal nanoparticles produced by the process comprising the steps of:
    providing a mixture consisting essentially of a metal salt and a passivating solvent;
    mixing the mixture of said metal salt and said passivating solvent;
    heating the mixture of said metal salt and said passivating solvent to a temperature above the melting point of said metal salt and maintaining the temperature above the melting point of said metal salt to form metal nanoparticles; and
    adding particles comprising $Al_2O_3$ or $SiO_2$ and having a particle size of 1 to 2 microns, thereby providing supported metal nanoparticles comprising said particles.

16. A supported metal nanoparticle comprising a metal nanoparticle and a support, wherein the support comprises $Al_2O_3$ or $SiO_2$ having a surface area of 300 to 500 $m^2/g$.

17. The supported metal nanoparticle of claim 16, wherein the metal nanoparticle comprises a transition metal.

18. The supported metal nanoparticle of claim 17, wherein the transition metal is iron, palladium, nickel, or molybdenum.

19. A supported metal nanoparticle comprising a metal nanoparticle and a support, wherein the support comprises $Al_2O_3$ or $SiO_2$ having a particle size of 1 to 2 microns.

20. The supported metal nanoparticle of claim 19, wherein the metal nanoparticle comprises a transition metal.

21. The supported metal nanoparticle of claim 20, wherein the transition metal is iron, palladium, nickel, or molybdenum.

* * * * *